United States Patent
Ragni et al.

(10) Patent No.: US 8,403,201 B2
(45) Date of Patent: Mar. 26, 2013

(54) METHOD, APPARATUS AND PLANT FOR MANUFACTURING SHELL STRUCTURES

(75) Inventors: Giuseppe Ragni, Milan (IT); Bruno Bisiach, Venaria (IT)

(73) Assignees: Bisiach & Carru S.p.A., Venaria Reale (IT); Alenia Aermacchi S.p.A.

( * ) Notice: Subject to any disclaimer, the term of this patent is extended or adjusted under 35 U.S.C. 154(b) by 951 days.

(21) Appl. No.: 12/307,850

(22) PCT Filed: Jul. 12, 2007

(86) PCT No.: PCT/IB2007/052781
§ 371 (c)(1),
(2), (4) Date: May 19, 2009

(87) PCT Pub. No.: WO2008/010159

PCT Pub. Date: Jan. 24, 2008

(65) Prior Publication Data
US 2009/0313830 A1    Dec. 24, 2009

(30) Foreign Application Priority Data

Jul. 14, 2006 (IT) .............................. TO2006A0518

(51) Int. Cl.
*B23K 37/04*        (2006.01)
*B25B 5/00*        (2006.01)
(52) U.S. Cl. ......................... 228/44.3; 228/44.5; 269/86
(58) Field of Classification Search ........................ None
See application file for complete search history.

(56) References Cited

U.S. PATENT DOCUMENTS

| 1,922,063 | A |   | 8/1933  | Vaughn                       |
|-----------|---|---|---------|------------------------------|
| 2,974,217 | A | * | 3/1961  | Crawford ............... 219/101 |
| 3,945,676 | A | * | 3/1976  | Asamoto ................ 294/202 |
| 4,039,115 | A | * | 8/1977  | Randolph et al. ......... 228/44.5 |
| 4,145,593 | A | * | 3/1979  | Merrick et al. .......... 219/60 A |
| 4,190,184 | A | * | 2/1980  | Oelke et al. ............... 225/2 |
| 4,565,003 | A | * | 1/1986  | McLeod .................. 29/281.1 |
| 4,822,272 | A |   | 4/1989  | Yanase et al.                |
| 5,586,391 | A | * | 12/1996 | Micale ................... 29/897.2 |
| 5,685,996 | A | * | 11/1997 | Ricci ................... 219/121.39 |
| 5,975,405 | A | * | 11/1999 | Tsuchiya et al. .......... 228/44.5 |
| 6,032,343 | A | * | 3/2000  | Blanch et al. ............ 29/33 R |
| 6,481,770 | B2| * | 11/2002 | Tholander et al. .......... 294/100 |
| 6,564,845 | B1| * | 5/2003  | Agawa .................... 156/403 |
| 6,840,433 | B2| * | 1/2005  | Vermaat .................. 228/212 |
| 6,942,139 | B2| * | 9/2005  | Lipnevicius .............. 228/102 |
| 7,188,879 | B2| * | 3/2007  | McIntosh et al. .......... 294/197 |

(Continued)

FOREIGN PATENT DOCUMENTS

DE    101 22 092 A1    11/2002
EP    0 444 627 A1    9/1991

(Continued)

*Primary Examiner* — Kiley Stoner
(74) *Attorney, Agent, or Firm* — Sughrue Mion, PLLC

(57) ABSTRACT

According to the invention, a shell handling carriage (19) is provided with grippers (194) which grip the end edges of a shell (2) made of composite material still fixed to a molding drum (11). An expeller strut (13) prevents the drum (11) from moving while the carriage (19) translating 5 removes the shell (2) from the drum (11). The shell (2) is then transported by the carriage (19) to a working station in which robots rivet the transversal ribs on it. The transversal ribs reach the robot working position orderly arranged on a self-moving rib store, which is inserted in the shell (2) itself.

9 Claims, 13 Drawing Sheets

U.S. PATENT DOCUMENTS

| | | | |
|---|---|---|---|
| 7,854,361 B2 * | 12/2010 | Gauggel | 228/49.1 |
| 2002/0069531 A1 * | 6/2002 | Walker et al. | 29/897.2 |
| 2006/0118235 A1 | 6/2006 | Lum et al. | |
| 2007/0018370 A1 * | 1/2007 | Reissenweber | 269/86 |
| 2010/0044350 A1 * | 2/2010 | Heiml et al. | 219/121.14 |
| 2010/0257912 A1 * | 10/2010 | Tiberghien et al. | 72/305 |

FOREIGN PATENT DOCUMENTS

| | | |
|---|---|---|
| EP | 1 149 687 A2 | 10/2001 |
| ES | 2 251 270 A1 | 4/2006 |
| WO | 2006/001860 A2 | 1/2006 |

* cited by examiner

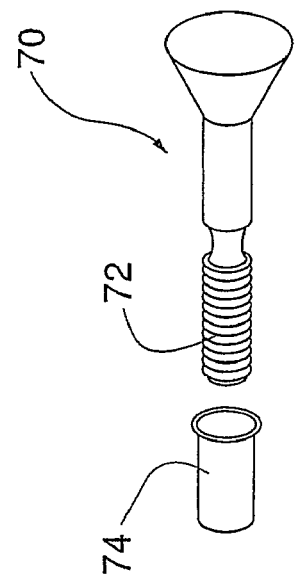
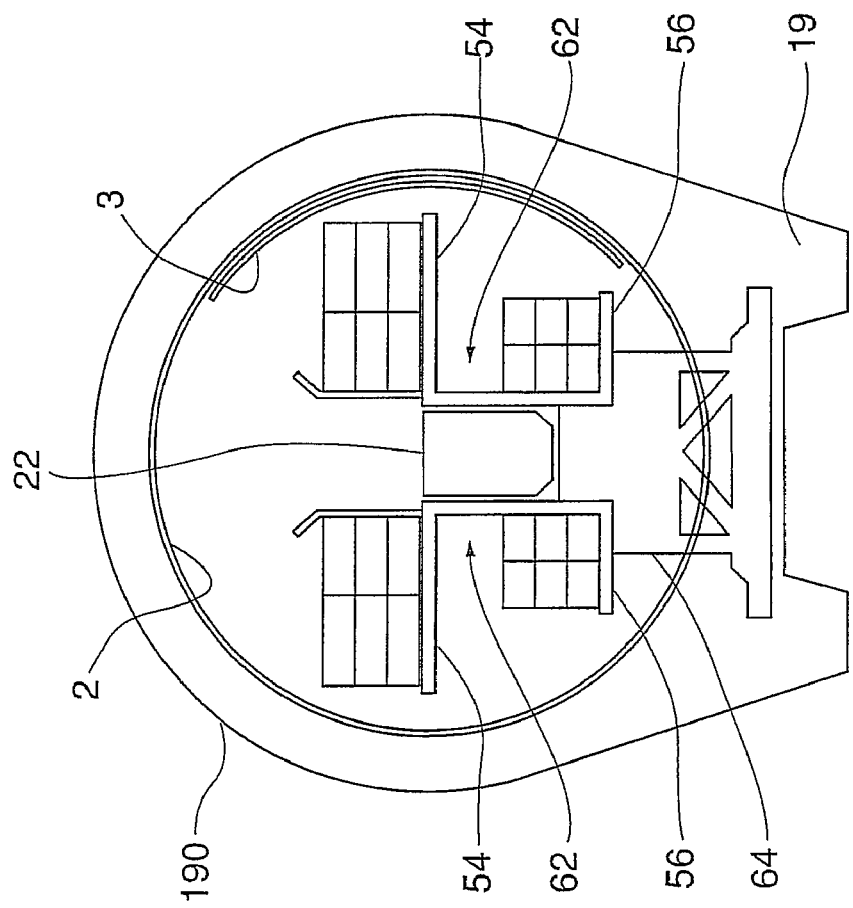

METHOD, APPARATUS AND PLANT FOR MANUFACTURING SHELL STRUCTURES

CROSS REFERENCE TO RELATED APPLICATION

This application is a National Stage of International Application No. PCT/IB2007/052781 filed Jul. 12, 2007, claiming priority based on Italian Patent Application No. TO2006A000518, filed Jul. 14, 2006, the contents of all of which are incorporated herein by reference in their entirety.

FIELD OF THE INVENTION

The present invention relates to a method, an equipment and a plant for working shell structures, in particular but not limited to shell structures of aircrafts.

BACKGROUND ART

Currently new techniques are under development, for manufacturing large-capacity airplanes for civil use and for transporting passengers. According to such techniques, the load beaannular structure of the aircraft fuselage is mostly made up of composite materials, such as carbon fibers buried in suitable resins. A technique currently under way of development consists in assembling the airplane fuselage by connecting a plurality of cylindrical and non-cylindrical segments, currently named "barrel" in the Anglo-Saxon technical jargon, or correspondingly "barili" in the Italian jargon.

The barrels that will form an aircraft can be manufactured by different constructors, and delivered already provided with floors, seats, windows and doors before the complete fuselage is assembled.

Manufacturing an airplane in this way involves among other things unknown problems of industrialization and concerning production equipments: in fact the known production methods and equipments have been used up to now for manufacturing traditional civil aircrafts for transporting passengers, having a mostly metallic fuselage structure—typically made up of titanium and aluminum alloys. Re-using such known production methods and equipments, possibly with relatively contained adaptations, is not sufficient.

An object of the present invention is providing methods and/or equipments for manufacturing the new kind of aircrafts mentioned above, having a fuselage structure largely made up of composite materials.

SUMMARY OF THE INVENTION

In a first aspect of the present invention, this object is achieved with a method having the features according to claim 1.

In a second aspect of the present invention, this object is achieved with a gripping device having the features according to claim 22.

In a third party aspect of the present invention, this object is achieved with a plant having the features according to claim 29.

In a fourth aspect of the present invention, this object is second achieved with an equipment having the features claim 48.

In a fifth aspect of the present invention, this object is achieved with a plant having the features according to claim 52.

The advantages that can be achieved with the present invention will appear more evident, to a person skilled in the technical field, from the following detailed description of a non-limiting embodiment of the invention, provided with reference to the following schematic figures.

LIST OF FIGURES

FIG. 10 shows a side view of a detail of the station of FIG. 6 in still another instant of its operation, when the internal guide of the rib assembling station is fitted in the rib store;

FIG. 11 shows a rivet, according to the background art, used during the working at the station shown in FIG. 6.

DETAILED DESCRIPTION

Figure 1:
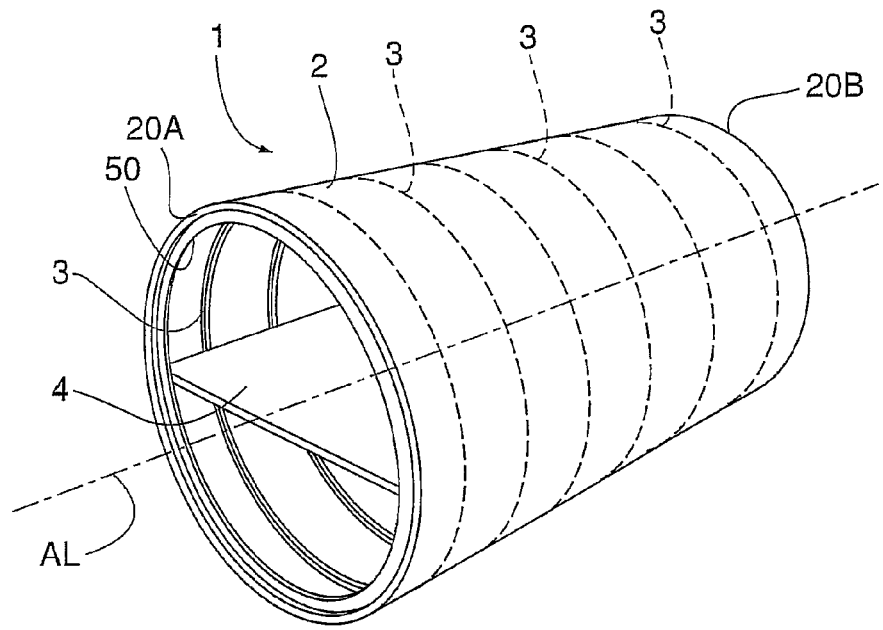
FIG. 1 shows a perspective view of a first example of a barrel, making part of an aircraft fuselage, having a load beaannular structure mostly made of composite material and having a substantially cylindrical tubular shape.

FIG. 1 schematically shows the load beaannular structure of a first embodiment of a shell structure obtainable with the method according to the invention: such embodiment of shell structure is a so-called "barile" ("barrel" in the Anglo-Saxon technical language), having a tubular shape.

Such structure, referred to as the overall numeral 1, comprises a cylindrical tubular shell 2—also referred to as "starting shell", in the present description—, a plurality of transversal strengthening ribs 3, approximately arc-shaped and arranged transversally to the longitudinal AL axis of the barrel, and a floor 4.

Figure 1A:
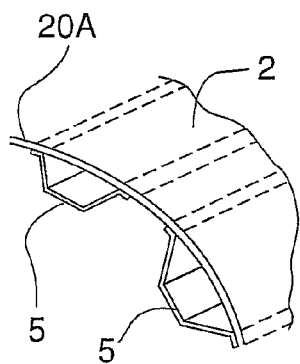
FIG. 1A shows a detail of the longitudinal add-on ribs of the barrel of FIG. 1.

In the present embodiment the raw shell 2, extending along the longitudinal AL axis, defines an inner through cavity 50 and is made of a suitable composite material, such as carbon fibers drown in a polymeric matrix. The shell 2 is longitudinally strengthened with a plurality of longitudinal ribs 5 (FIG. 1A), arranged longitudinally to the AL axis and made of composite material as well, such as the same composite material forming the external cylindrical wall of the shell 2.

In the present description, the term "add-on rib" indicates a particular kind of strengthening rib, made as a separate piece which is later fixed on the structure to be strengthened; therefore transversal ribs 3 will be also referred to as "add-on ribs" 3.

Transversal add-on ribs 3, currently also called "stringers", in the present example are made of a suitable titanium alloy, extend on several complete circumferences around the longitudinal AL axis and lie in several plans perpendicular to it.

Roughly, the cylindrical raw shell 2 has an external diameter of about 6 meters, and is about 10-16 meters long.

FIGS. 3, 3A-3D show the unmould station of an embodiment of a plant for manufacturing shell structures according to the present invention, in various instants of its operation.

In such embodiment the reference 11 refers to a supporting structure having a substantially cylindrical shape, and referred to as "molding drum" 11; in a cross-linking station or "baking station"—not shown—, the raw shell 2 has been formed on the flanks of the molding drum, by causing the synthetic resin, of which the raw shell 2 is made, to cross-link.

Figure 4:
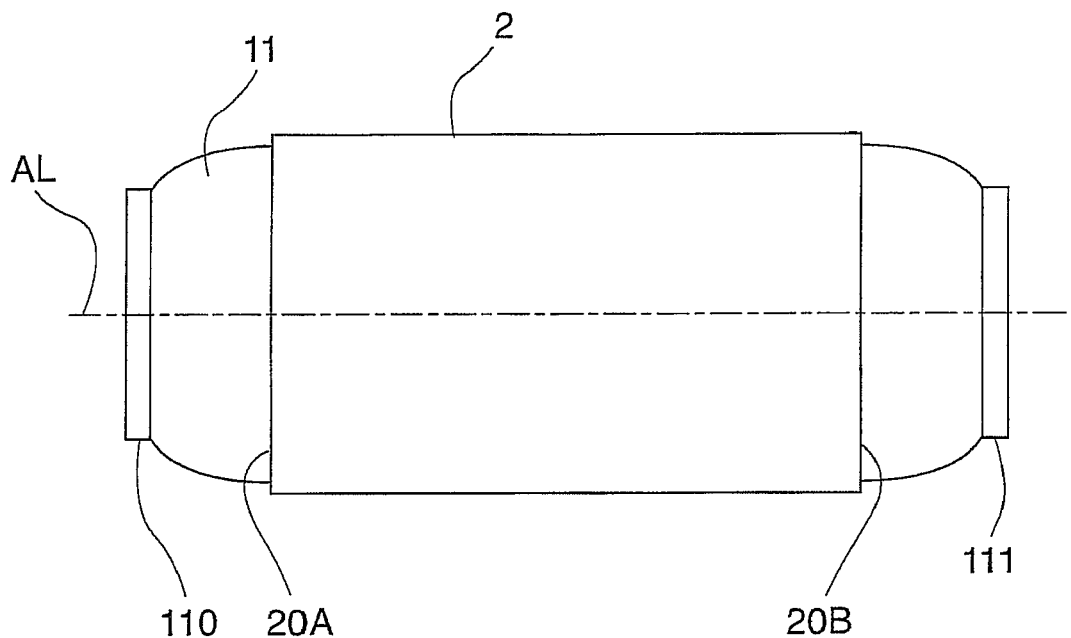
FIG. 4 shows a side view of the molding drum of the method of FIGS. 3, 3A-3D.

The molding drum 11 is shown in detail in FIG. 4: in the present embodiment, the drum 11 is provided at its ends with the supports 110, 111, which also have a substantially cylindrical shape and a diameter smaller than the diameter of the central part of the drum 11.

The molding drum reaches the unmould station 9 transported on a self-moving carriage 7, which can be for example a remotely controlled base or an automatic drive base (AGV).

The unmould station 9 comprises the displaceable supports 11, arranged for moving on the floor of the station and provided, in their upper part, with a cradle-shaped support zone 150, in its turn arranged for receiving and raising the end supports 110, 111 of drum 11, holding them in a stable position (FIG. 4).

Figure 3:
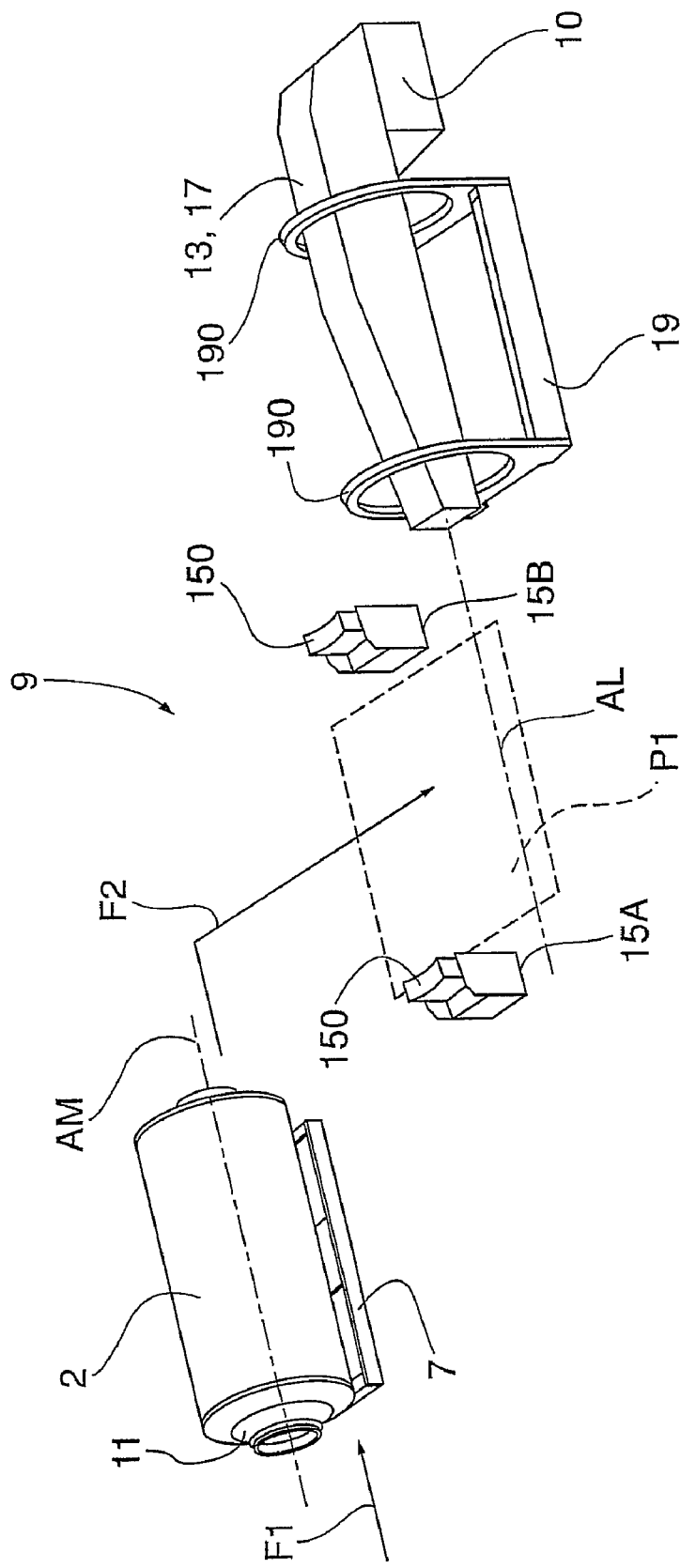
FIGS. 3, 3A, 3B, 3C show perspective views of four steps of a method according to an embodiment of the present invention, for transferring a raw shell from the molding drum to a shell handling carriage.
Figure 3A:
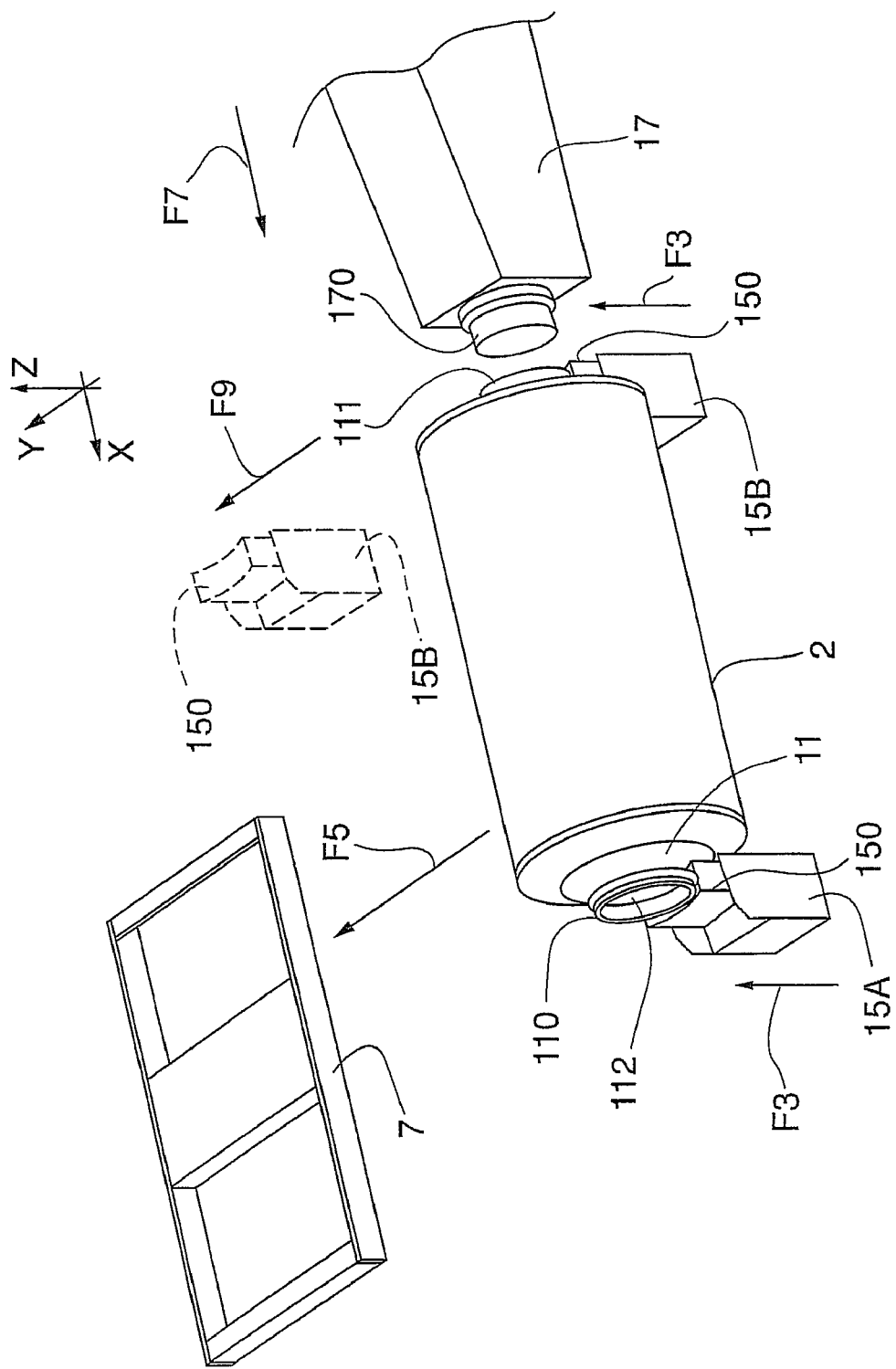

The unmould station 9 further comprises a so-called "expeller strut" 13, comprising a fixed beam 17 horizontally cantilevered and fixed to the fixed base 10. As shown in FIG. 3D, a coupling drum device 16 is arranged on the free end of beam 17, arranged for coupling the end supports 110 or 111 of the drum 11 both by supporting the latter vertically and by blocking its horizontal displacements. As an alternative to the telescopic pin 170 of FIG. 3A (the operation of which will be described in deeper detail later), the drum coupling device 16 of FIG. 3D comprises a mobile hooking tooth 18 that can rotate around the hinge 180; accordingly the end supports 110, 111 are provided in their inside with suitable inner teeth or flanges, with which the mobile hooking tooth 18 can engage.

In FIGS. 3, 3A-3C a shell handling carriage 19 is further shown, used for removing the raw shell 2 from the drum 11, removing the raw shell 2 from the unmould station 9 and handling it at the working stations downstream. In the present embodiment, just an indication the shell handling carriage 19 is a self-moving carriage, controlled by a remote or automatic control, and provided with two annular structures 190 which will be described later on in deeper detail. Each annular structure 190 defines internally a fixing opening 192 arranged so that the raw shell 2 can pass through it.

Figure 3B:
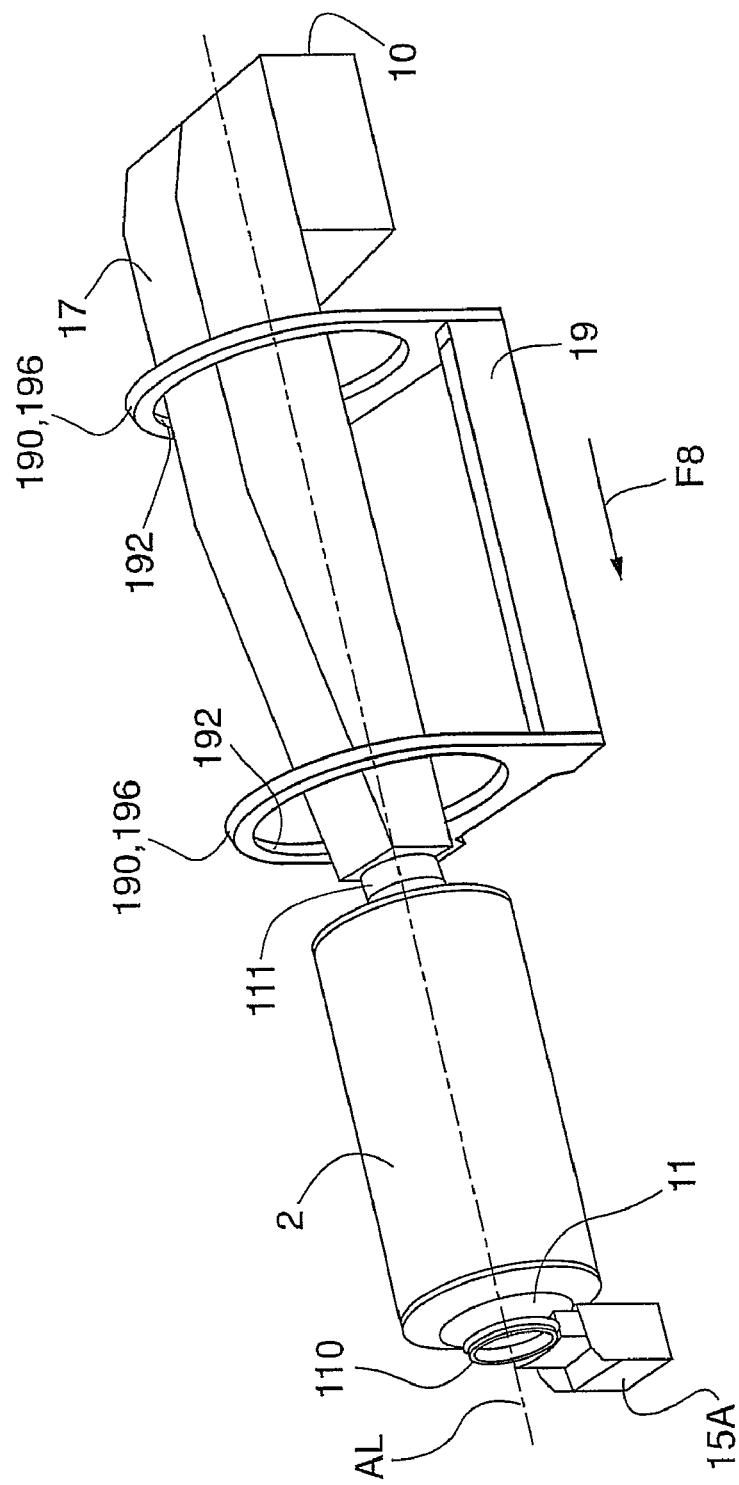

The axial distance between the two annular structures 190 is such to allow both the annular structures 190 be positioned at the same time by the end edges 20A, 20B (FIG. 4) of the cylindrical shell 2, causing the shell handling carriage 19 to translate parallel to the axis AM of the drum (see arrow F8 in FIG. 3B).

On each one of such structures 190 a plurality of blocking grippers 194 is arranged (FIG. 5), for gripping and holding a portion of the end edges 20A, 20B of the cylindrical shell 2. The structure and the kinematics of one of such grippers are the following.

Figure 5A:
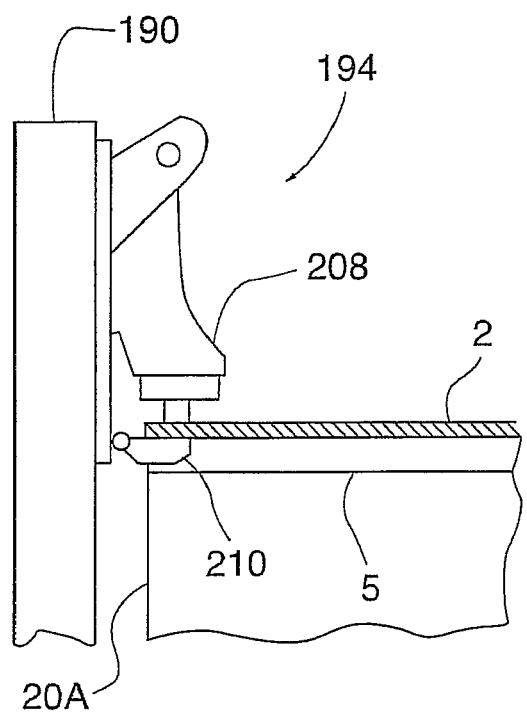
FIG. 5A shows a partially cross-sectioned side view of a detail of the gripper of FIG. 5.
Figure 5:
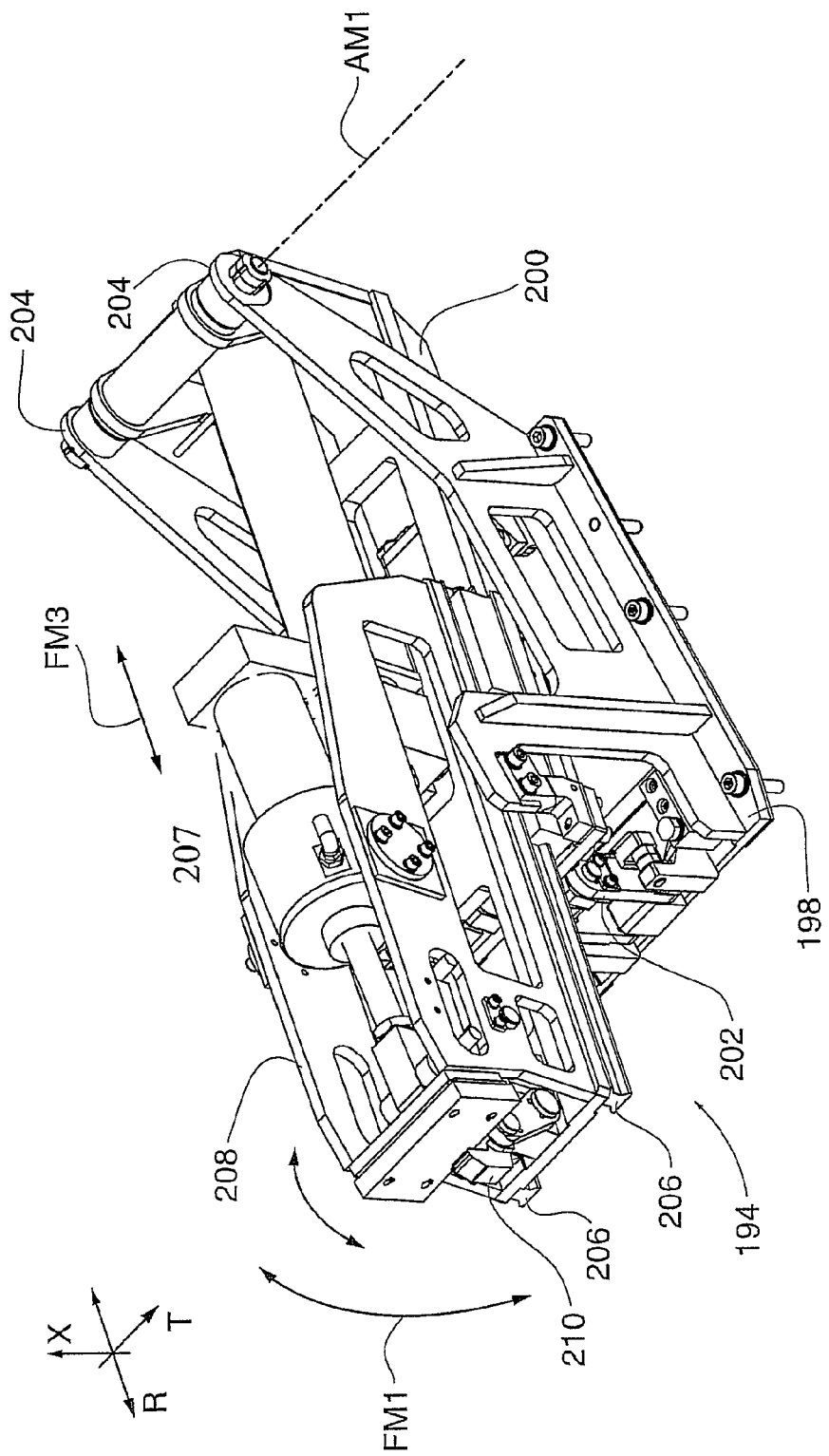
FIG. 5 shows a perspective view of a blocking gripper used in the method of FIGS. 3, 3A-3D.

A gripper 194 can be fixed—for example bolted—to one of the annular beams 196 through the fixing plate or fixing frame 198, and positioned in the space so that, in the triad of the Cartesian axes R, T, X of FIG. 5, the X-axis corresponds to the X-axis of FIG. 3A, and the axes R and T correspond to the radial and tangential directions respectively of the annular beam 196 and of the fixing opening 192 in the point in which the gripper 194 is set.

A movable base 200 is hinged to the fixing frame 198 so as to be able to rotate around the rotation axis AM1 in the directions indicated by arrow FM1, thanks to the hinges 204. In the present embodiment the rotation axis AM1 is parallel to the plan in which the fixing plate or fixing frame 198 lies, and is also parallel to the T axis of the triad of reference axes R, T, X of FIG. 5).

A fixed jaw 208 and a movable jaw 210 of the gripper are fixed on the movable base 200. The opening and the closing of the gripper 194 are driven by the determined from the rotation+translation movements of the movable jaw 210 in the plane RX, so as to be able to clamp the thickness of the external cylindrical wall of the shell 2; for example such rotation+translation movements can be made with a first toggle mechanism. Clearly, in other alternative and not shown embodiments, the gripper 194 can be provided for example with two jaws, both of them movable.

Thanks to the sliding guides 206 and a suitable actuator—in the embodiment of FIG. 5, the pneumatic cylinder 207—the assembly of the fixed jaw 208 and the movable jaw 210 can translate parallel to the R axis (arrow FM3).

In the embodiment shown in the enclosed Figures, on each ring-like beam 196 a set of about forty of blocking grippers 194 are arranged, oriented according to the radial directions R of the beam 196 itself.

Advantageously the rotation of the movable base 200 around the rotation axis AM1 is driven by a toggle mechanism 202 (FIG. 5).

Advantageously the pneumatic cylinder 207 is provided with a stem-blocking device, or with another system able of keeping the cylinder blocked in a predetermined linear position even when the cylinder is disconnected from the feeding pneumatic circuit.

Advantageously the movements of closing and opening the movable jaw 210 are driven by a second toggle mechanism (not shown).

An advantage provided by the two aforesaid toggle mechanisms and the stem-blocking device, or another system able of keeping the cylinder 207 blocked in a predetermined linear position, is that a shell structure 2 can be kept clamped and blocked on a shell handling carriage 19 even when the latter is disconnected from its feeding pneumatic—or fluidic—circuit, such as a compressed air circuit, as it happens in the present embodiment during several steps of handling the shells 2.

FIGS. 6-10 show the rib assembling station 20, where the holed are made, for riveting the cross-sectional strengthening ribs 3 to the cylindrical shell 2.

The rib assembling station 20 comprises a central or internal guide 22 and two side—or external guides 24, 26, parallel one with another. The internal guide 22 comprises a carrying beam 28—also referred to as, in the present description, "central beam"—supported by a fixed central support 30—arranged at about half of the length of the central beam 28—and by two displaceable supports 32A, 32B arranged at the two ends of the central beam 28. Two anthropomorphic robots 34A, 34B, in the present description referred to as "internal robots 34A, 34B", are set on the internal guide 22 so as to be able to slide along the guide itself (arrow F12 in FIG. 6), while on each one of the external guides 24, 26 movable tower—36, 38 respectively—is set, slidable along its respective guide 24, 26. On each movable tower 36, 38 an anthropomorhic robot—40, 42 respectively—is set, referred to as "external robot" 40, 42 respectively in the present description. In the present embodiment, the four robots are arranged to be able to work simultaneously, and the external robots 40, 42 are provided with drilling heads—for example of the type described in the patent application No. TO2002A000030, filed on Nov. 1, 2002 by one of the applicants/assignees of the present application, while the task of the internal robots 34A, 34B is mainly providing a rigid support for the shell 2 during the drilling, in the zone in which the external robot 40 or 42 is drilling. This allows the cylindrical shell 2 be drilled with great precision, even if the shell is quite deformable, like for example in the present embodiment, wherein the shell when is being drilled is made up only of a cylindrical composite material wall having a thickness of about ten millimeters, a diameter of 6 m and a length of 9-16 m. As it will be described in deeper detail later on, in the present embodiment the external and internal robots are arranged also for riveting the ribs 3 on the raw shell 2.

Advantageously the inner 22 and external guides 24, 26 have such a length to allow two cylindrical shells 2 and two shell handling carriages 19 be slipped on said guides at the same time, in their respective working positions 21, 23 (FIG. 8): as it will turn out more clearly from the following description, this concurs to improve the productivity of the plant, and in particular of the internal 34A, 34B and external robots 40, 42.

Figure 9:
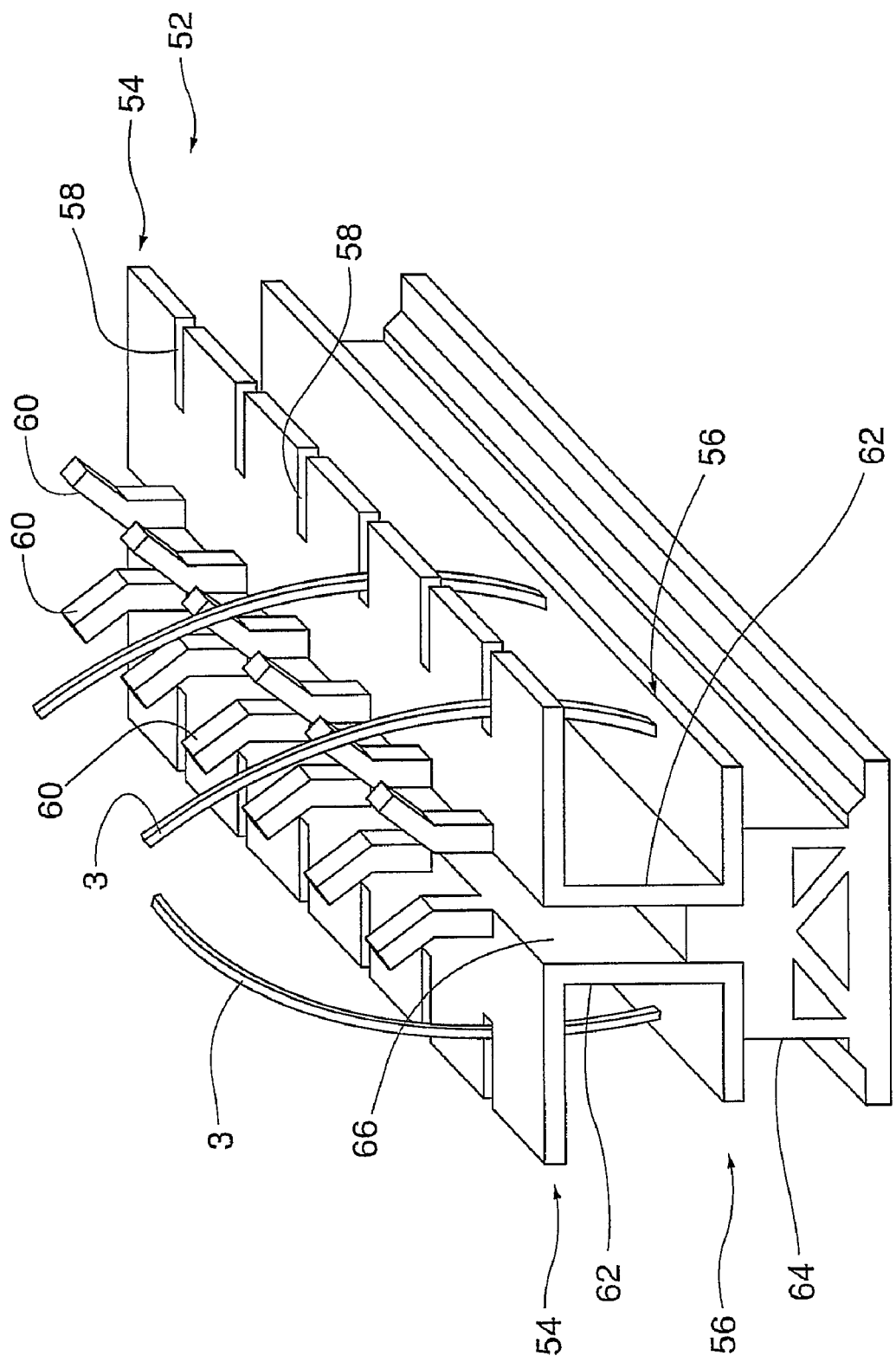
FIG. 9 shows a perspective view of a rib store according to the present invention.

FIGS. 9, 10 show an embodiment of a rib store 52 of a plant according to the present invention. The rib store 52 is a mobile structure comprising, in the present embodiment, two upper consoles or balconies 54 and two lower consoles or balconies 56–on which the personnel can walk. The rib store also defines a plurality of rib seats arranged for receiving and to supporting—for example orderly aligned like on a rack (FIG. 9)—a plurality of transversal add-on or strengthening ribs 3, or parts thereof, waiting for being assembled to the cylindrical shell 2. In the present embodiment, the seats for the add-on ribs 3 to be assembled comprise the recesses 58, made in the upper balconies 54, and the uprights 60, arranged as well on the upper balconies 54. Suitable fastenings or positioning seats can be also arranged on the lower footpaths 56. Still in the present embodiment, each pair upper balcony 56+lower balcony 54 is made on a structure 62 having the overall shape of a C-beam. The pair of C-beams 62 is set on a driving carriage 64, such as a remote control carriage or an automatic controlled carriage. Between the two C-shaped structures 62 a space is provided, referred to as guide passage seat 66, such as to allow internal guide 22 of working positions 21, 23 be inserted in it.

The operation of the previously described plant will be now described.

FIG. 3 schematically shows a first instant of the operation: in such instant the cylindrical shell 2, coming from a cross-linking—or "baking" station (not shown), is transported, in a horizontal or however laying position, on the self-moving carriage 7, towards an unload station indicated with the reference numeral 9. The raw shell 2 travels on the carriage 7 still fitted on the support 11. Said support 11 has an approximately cylindrical shape and is referred to as "cross-linking drum 11" or simply "drum 11". The drum 11 is used for forming the raw shell 2 by wrapping carbon fiber fabric onto it and burying the fabric in the synthetic resin, according to a process such as the one described in one of the documents WO2005/018917A2, WO2005/018918A2 Or WO2005/082604A2.

Figure 2:
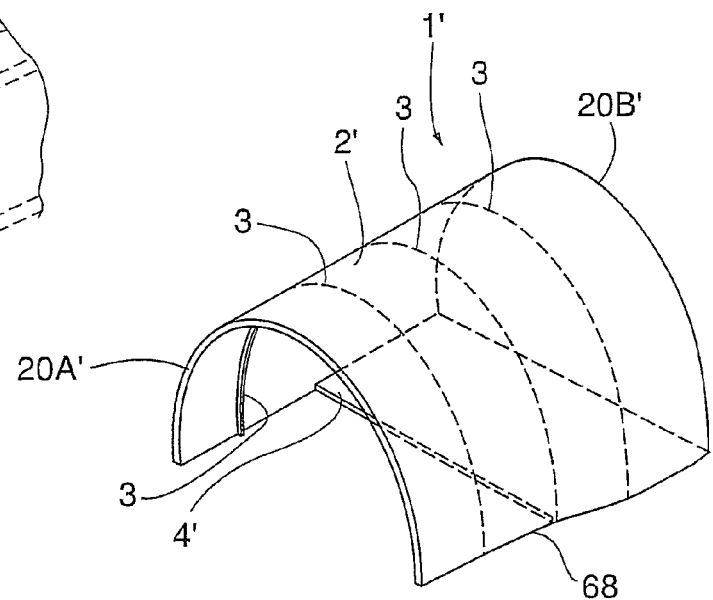
FIG. 2 shows a perspective view of a second example of barrel, being a part of an aircraft fuselage and having a load beaannular structure mostly made of composite material, and a substantially semitubular shape.

By moving as indicated by the arrows F1, F2 of FIG. 3, the carriage 7, together with the drum 11 and the raw shell 2 reaches the position P1 of FIG. 2, so that a) the longitudinal axis AM of the drum is substantially aligned with the strut 13, and b) the end supports 110, 111 of the drum 11 are positioned above the raising supports 15A, 15B, also said, in the present description, "displaceable supports 15A, 15B" (FIG. 3). Thanks to a suitable raising system, the cradles 150 raise (arrows F3 of FIG. 3A) lifting in their turn the drum 11 (FIG. 3A), so as to allow the carriage 7 be extracted from below the drum 11, and be removed (arrow F5 of FIG. 3A).

While the drum 11 is supported by the supports 15, the expeller strut 13 comes closer to and firmly engages the end 111 of the drum 11 moving in a direction parallel to the AL axis of the drum (see arrow F7 of FIG. 3A), supporting the end 111 of the drum as much as to allow the telescopic support 15B, closer to the strut 13, be withdrawn and removed by causing it slide transversally to the drum (see arrow F9 of FIG. 3A). In the embodiment of FIG. 3A, the expeller strut 13 makes itself firm and is able to firmly support the end 111 of the drum 11 thanks to telescopic pin 170, which by extending engages a corresponding female seat 112 provided at the 110, 111 of the drum 11.

At this point the assembly drum 11+shell 2 is supported only by the raising support 15A and by the cantilevered end of the strut 13, engaged with the drum coupling device 16 (FIG. 3D).

Figure 3C:
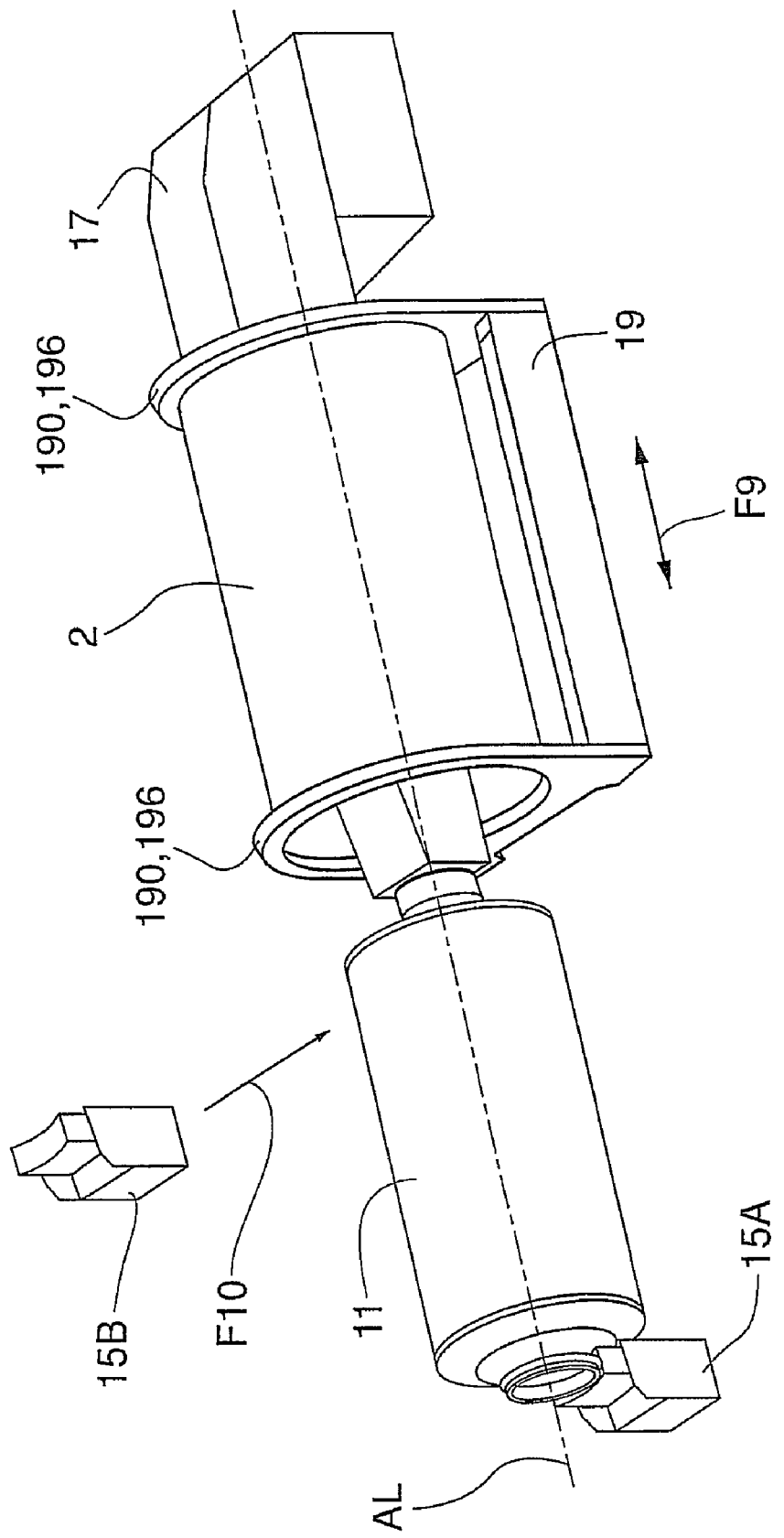
Figure 3D:
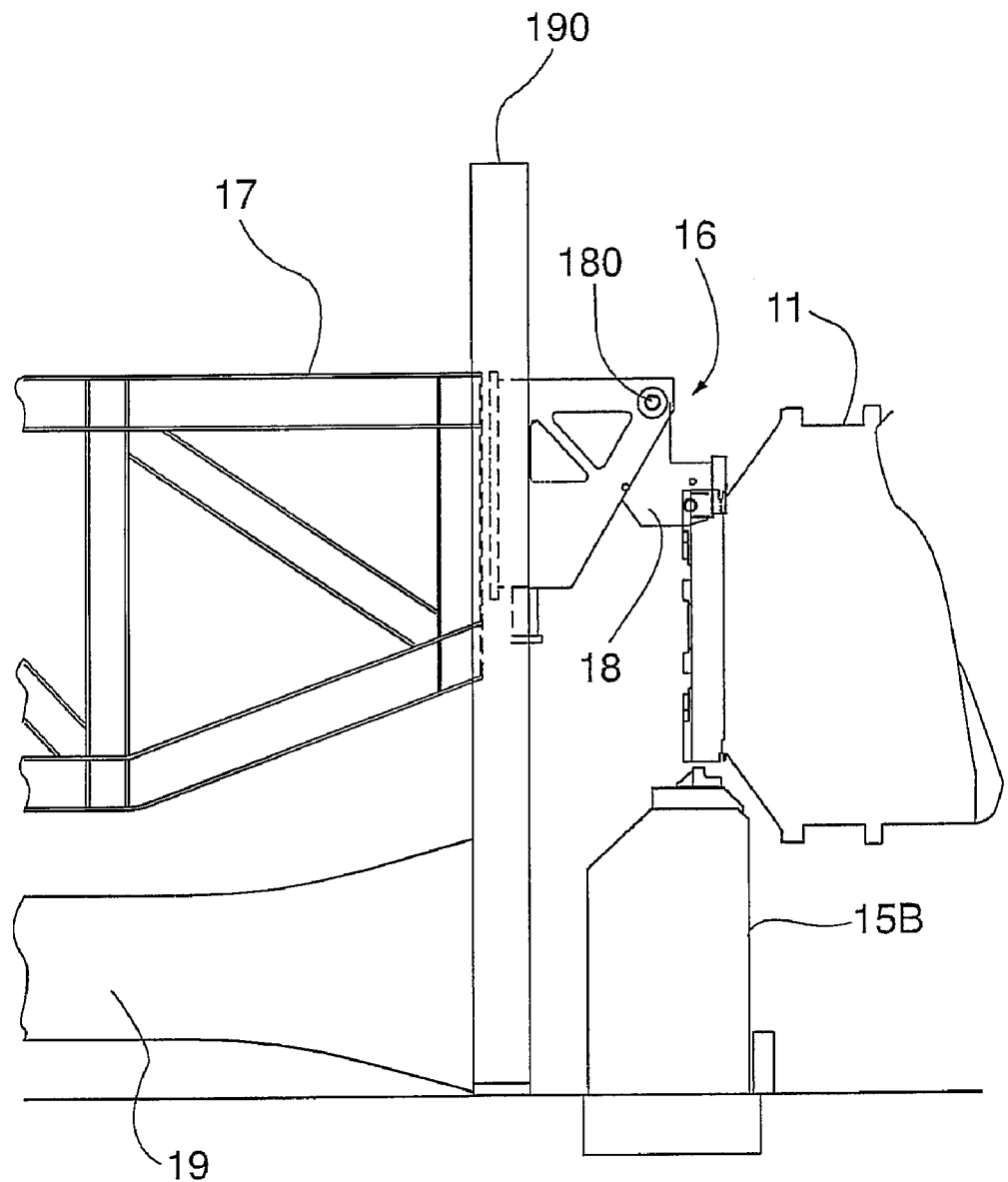
FIG. 3D shows a side view of a detail of a fifth step of the method of FIGS. 3, 3A-3C.

Beforehand the shell handling carriage 19 had been fitted around the strut 13 (FIG. 3B): the shell handling carriage 19 translates in a direction parallel with the AL axis so as to come closer to the displaceable support 15A (see the F8 arrow), until it is putted on the two annular structures 190 on the cylindrical shell 2 (FIG. 3C).

When both of the annular structures 190 reach the end edges 20A, 20B (FIG. 4) of the cylindrical shell 2, the grippers 194 are driven according to a suitable sequence and clamp the thickness of the end edges 20A, 20B (FIG. 4) of the cylindrical shell 2. The separation of the drum 11 from the cylindrical shell 2 is also helped by the fact that the middle portion of the drum, on which the shell has been formed, is splitted in a suitable number of gores or sectors (not shown) which can radially expand and retract. In the phase shown in FIG. 3C such gores or sectors retract radially so as to detach the raw shell 2 from the drum surface; then the shell handling carriage 19 moves again towards the strut 13 with a translation parallel to the AL axis (see arrow F9 of FIG. 3C), dragging and removing the cylindrical shell 2 off the drum 11. The raising support 15B moves again towards the drum (see arrow F10 of FIG. 3C), and the latter is transferred on the carriage 7 by the displaceable supports 15A, 15B and evacuated.

The shell handling carriage 19 is now used for handling the cylindrical shell 2, which now is accessible also at its inside, during a plurality of following working steps.

In the present embodiment of the method according to the invention, the carriage 19 carries the shell 2 to a measuring station, where a detecting device—for example a laser geometry measurer-maps the whole raw shell 2, detecting among other things the displacements of the reference holes ("DA holes") due to the deformations of the shell 2 following removal of drum 11: in fact the "DA holes" are a set of holes used as reference in all of the following workings, and in the present embodiment had been made beforehand when the raw shell 2 was still inserted on the drum 11.

In order to be able to easily scan and map the whole external surface of the shell 2, advantageously the shell handling carriages 19 are provided with a rotary actuator arranged for turning the shell 2 on itself on its longitudinal AL axis: by turning in this way the shell 2, the laser head of the detecting device does not need to be introduced in the space between the lower part of the shell and the bottom of the ring carriage 19, thereby avoiding the problems with the overall dimensions and the passing of the laser head relating thereto; furthermore the laser scan head does not even need to be mounted on an articulated arm, avoiding thereby the precision losses of precision due to such arm.

Advantageously also the aforesaid rotary actuator, arranged for rotating the shell 2 on its longitudinal AL axis, can be blocked in a predetermined position also when pneumatic, fluidic or electric supply is lacking: this allows a shell structure 2 be kept clamped and fixed in a determined position on a shell handling carriage 19 also when the carriage 19 is disconnected from its pneumatic—or fluidic, or electric—supply circuit, for example from a compressed air circuit, as it happens in the present embodiment during several steps of the handling of shells 2.

Figure 6:
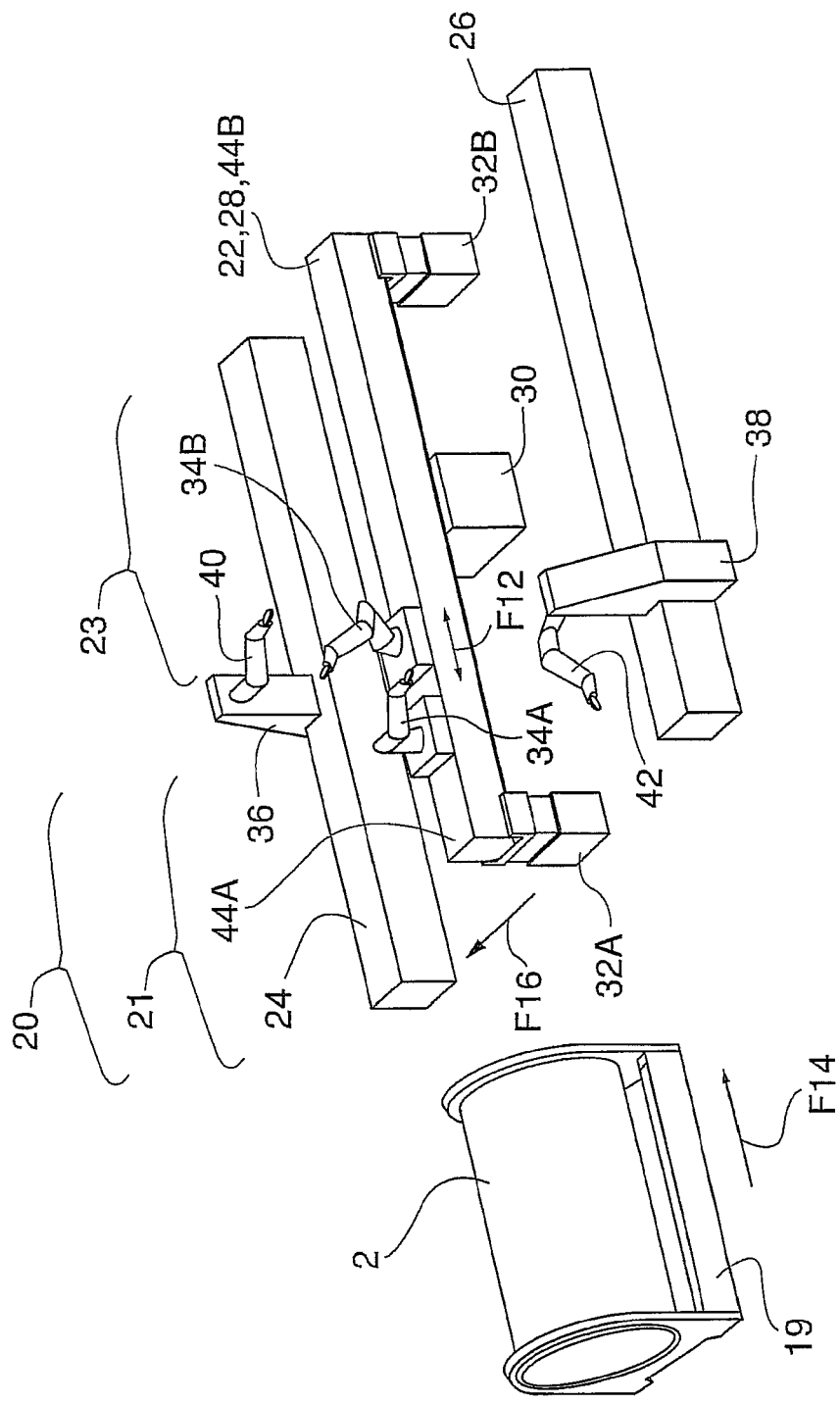
FIG. 6 shows, a perspective view of the rib assembling station according to an embodiment of the present invention, in an instant of its operation.
Figure 7:
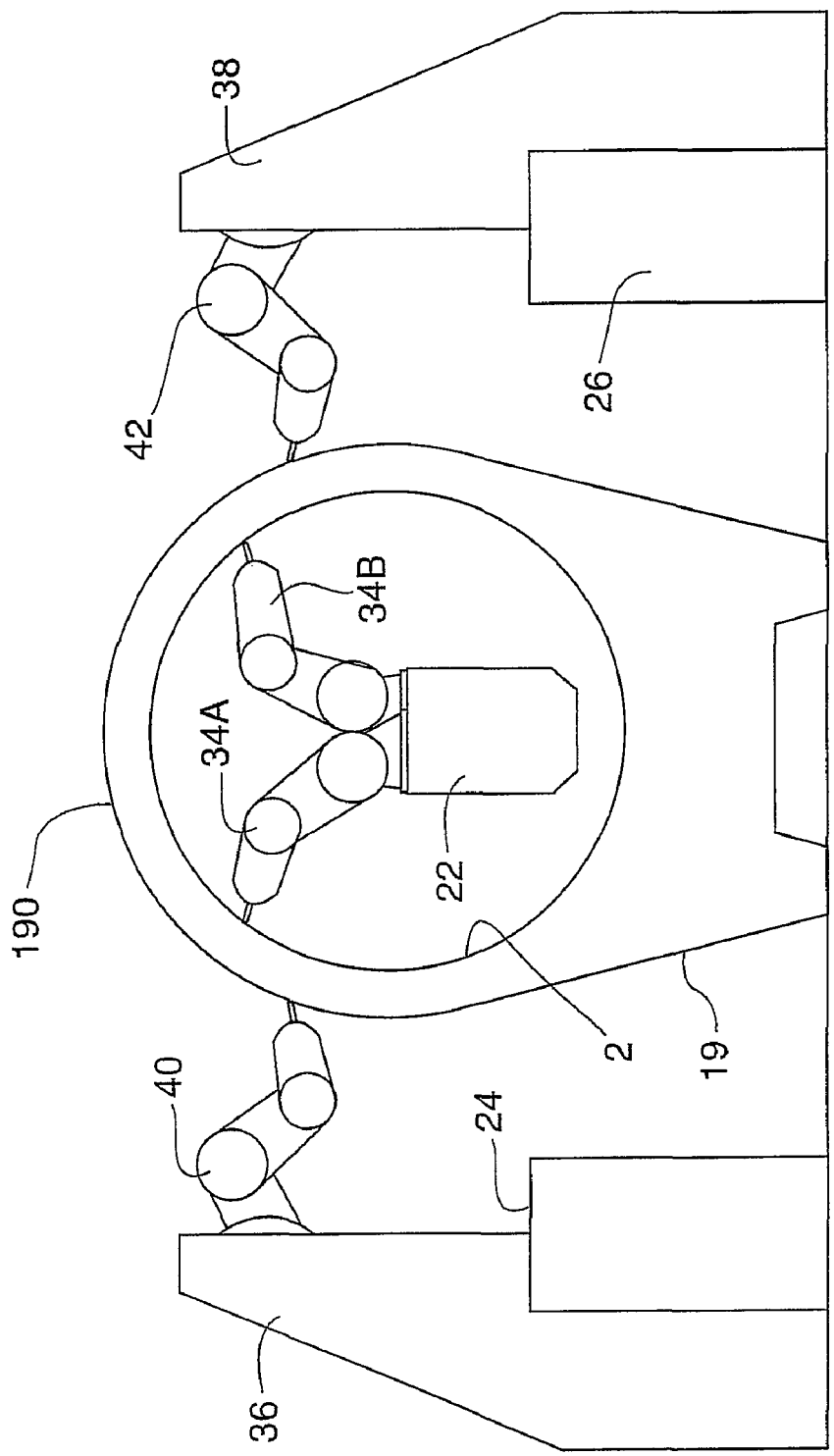
FIG. 7 shows a side view of a detail of the station of FIG. 6.
Figure 8:
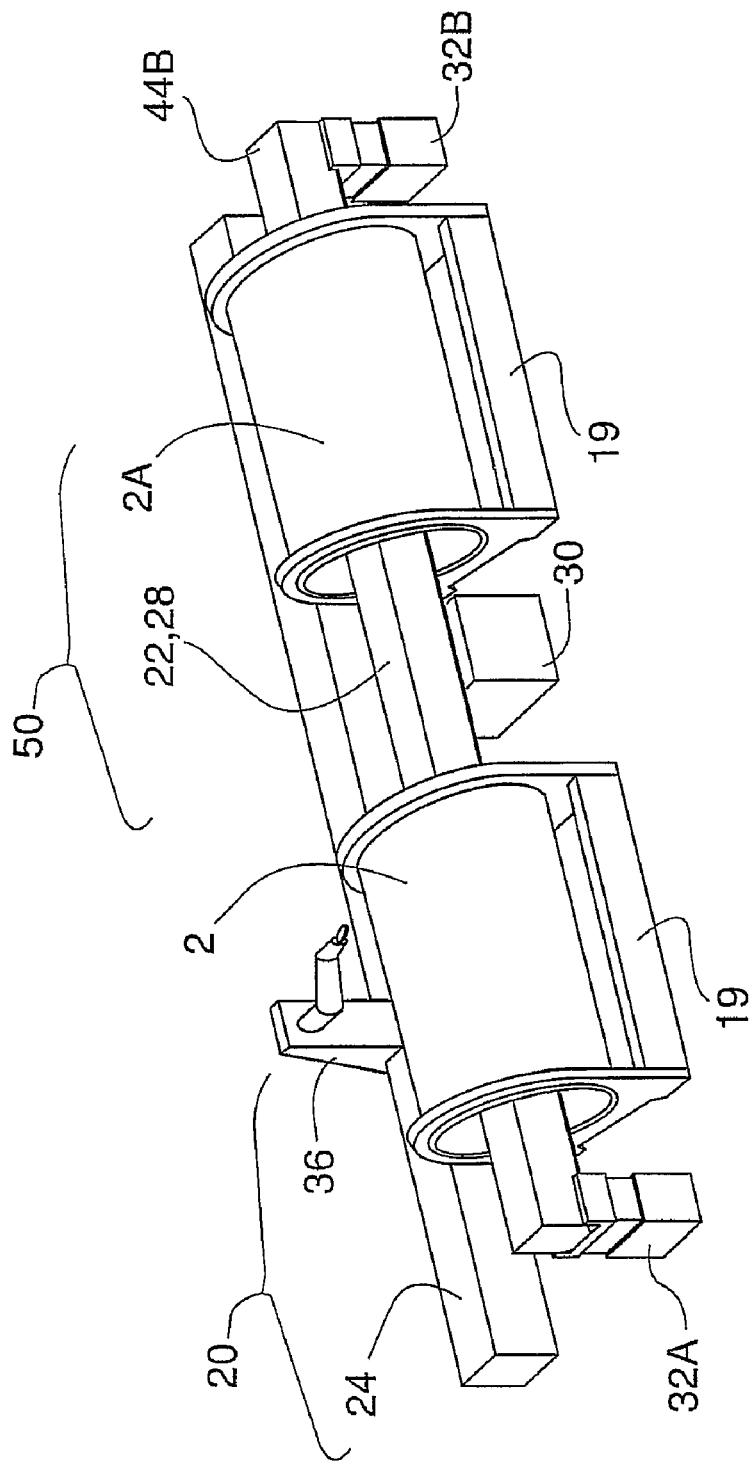
FIG. 8 shows a perspective view of a detail of the station of FIG. 6 in another instant of its operation.

Returning to the description of the working method, in the present embodiment after the aforesaid mapping the carriage 19 carries the shell 2 to the rib assembling station, shown in FIGS. 6, 7 and indicated with the overall reference 20: in such station the holes are made, for riveting the transversal strengthening ribs 3 to the cylindrical shell 2, with the following process. The shell handling carriage 19, after has left the measuring station (not shown), transports the cylindrical shell 2 to the rib assembling station 20, coming closer to it in a direction approximately longitudinal to the guides 22, 24, 26 (arrow F14 of FIG. 6). The displaceable support 32A moves to one side (arrow F16 of FIG. 6 laterally) so as to allow the shell handling carriage 19 be fitted onto the cantilevered end of the central beam 28 in the inner cavity of the tubular shell 2 (FIG. 7).

The shell handling carriage 19 keeps sliding along the internal guide 22 until it reaches the correct working position, at which it stops and is blocked by suitable lockings, such as mechanic lockings. The driving carriage 64, which previously was supplying the shell handling carriage 19 with the motive power so as to move it, separates from the shell handling carriage itself and leaves the rib assembling station 20 (arrow F20 of FIG. 6A); the displaceable support 32A remains displaced at a side so as to allow the driving carriage 46 to pass.

After that, the displaceable support 32A positions itself again below the end 44A of the central beam 28 with an lateral movement opposite to the previous one (see arrow F18 of FIG. 6A), so as to support the central beam 28 again.

When the shell handling carriage 19 is in the aforesaid working position, the internal 34A, 34B and external robots 40, 42 drill the holes in the cylindrical shell 2 for allowing the transversal add-on ribs or strengthening ribs 3 be fixed to the shell. As shown in FIG. 7, the internal robots 34A, 34B operate inside of the cylindrical shell 2, while at the same time the external robots 40, 42 operate outside.

When the drillings planned on the working position 21 are completed, the robots 34A, 34B, 40, 42 leave the only just drilled shell 2 and move—by simply translating along their respective guides 22, 24, 26—on the second working position 23 of the rib assembling station 20 (FIGS. 6, 8); on the station 20 the robots 34A, 34B, 40, 42 can for example perform drilling workings, such as the ones just described, on a second cylindrical shell 2A, or the riveting workings as described later on.

After the robots 34A, 34B, 40, 42 have left the position 21, the rib store 52 driven by the driving carriage 64 is fitted over the internal guide 22 from the side of position 21; in order to be able to do that, the displaceable support 32A in the present embodiment is displaced at a side (arrow F16 of FIG. 6). The rib store 52 is then caused to slide along the internal guide 22 until it enters the fixed cylindrical shell 2 on one of the shell handling carriages 19 (FIG. 10).

In the various seats of the rib store 52 the transversal add-on ribs 3 to be assembled to the shell 2 had been previously loaded, arranging them orderly so that, when the rib store 52 reaches its predetermined working position into the cylindrical shell 2, each add-on rib 3 to be assembled is positioned in front of the point of shell 2 in which it has to be riveted or welded. This renders remarkably easier the following fastening of the add-on ribs 3 on the shell 2.

The personnel can now go on the upper 54 or lower balconies 56, depending on the need, and start assembling the add-on ribs 3 on the shell 2 from the inside; thanks to the orderly arrangement of the add-on ribs 3 on the seats of the rib store 52, the personnel can take each add-on rib from its seat 58, 60 and assemble it on the facing portion of the shell 2. In the present embodiment, the personnel fastens temporarily the add-on ribs 3 to the shell 2 with some temporary studs or rivets, for example two of them. When the manual and temporary assembling of the add-on ribs 3 is over, the rib store 52 is removed from the internal guide 22 and evacuated from the working position 21.

Now, in the present embodiment the robots 34A, 34B, 40, 42 move again to the working position 21 and rivet the transversal add-on ribs 3 on the cylindrical shell 2. In FIG. 11 an example of rivet is shown, known per se, suitable for such riveting. In the present embodiment the external robots 40, 42 insert a rivet of the kind of FIG. 11 from the outside of the shell 2; thereafter the internal robots 34A, 34B pull the threaded end 72 of the rivet 70 until stripping it off, and fit the blocking bushing 74, per se known.

When the riveting is over, the barrel is transferred to other working stations, wherein for example the floor 4 is inserted and fastened (FIG. 1).

It is pointed out that, the matter of having only one triad of guides 22, 24, 28 in common for two working positions 21, 23 remarkably helps in reducing the dead times between one working and another one and in limiting the displacements of the robots 34A, 34B, 40, 42 and of other apparatuses, increasing the productivity of the plant. In fact, it is possible for example arranging a production process cycle combining the workings on positions 21 and 23 as follows:

on position 21 the robots 34A, 34B, 40, 42 perform the drilling of a first cylindrical shell 2, while at the same time on position 23 a first rib store 52 is inserted, and personnel manually and temporary assemble the transversal add-on ribs 3 on a second and previously drilled shell 2; when such operations are over the robots 34A, 34B, 40, 42 move to the position 23, simply sliding along their respective guides 22, 24, 26, and perform the definitive riveting of the add-on ribs 3 on the second cylindrical shell 2, while at the same time a second rib store 52 is inserted on the position 21, and some personnel manually and temporarily assemble the transversal add-on ribs 3 on the first shell 2; when these operations are over the shell handling carriage 19 is removed from the working position 23, together with the second cylindrical shell 2 definitively riveted, and a third cylindrical shell 2 to be drilled is carried on another shell handling carriage 19 at the position 23; the robots 34A, 34B, 40, 42 are already positioned at the working position 23, and it can be arranged so that they do not need to leave that working position in order to be retooled for drilling; the robots can then drill the third tubular shell; at the same time, the first or a third rib store 52 is inserted on the working position 21, and some personnel assemble manually and provisionally transversal add-on ribs 3 on the previously drilled first shell 2.

Advantageously, in the previously described working process, the cylindrical shells 2 remain motionless at the working position 21 or 23 during the three operations of drilling, provisionally and definitively riveting the add-on ribs, and the robots 34A, 34B, 40, 42 are moved which have much smaller dimensions. As a compensation the rib stores 52 are moved, which have dimensions and weight comparable with the assemblies shell 2+shell handling carriage 19, but for drilling/provisionally riveting/definitively riveting each barrel a single no store is moved only once. Moreover using the rib stores 52 provides the advantages, already set forth above, that the manual positioning and assembling of the different add-on ribs on the cylindrical shell 2 is much quicker, and the risk of errors, such as positioning a wrong rib 3 in a predetermined portion of the shell 2, is greatly reduced. Moreover, a great number and choice of ribs can be brought to the barrel to be assembled with only one travel of the rib store 52.

The embodiments previously described are susceptible of several modifications and variations without departing from the scope of the present invention. For example, the working method and the devices according to the present invention can be adapted for manufacturing barrels having a semi-cylindrical or semitubular shape—such as the one shown in FIG. 2—frustum conical or in general of a concave and/or convex shell. In the case of a barrel having a semi-cylindrical shape such as the one shown in FIG. 2, the shell handling carriages 19 can be provided with a plurality of blocking grippers 194 arranged for gripping not only the end edges 20A', 20B' but also the side edges 68 (FIG. 2) of the semi-cylindrical shell 2'. The internal 34A, 34B and external robots 40, 42 can be replaced, more generally, with one or more internal working carriages 34A, 34B and with one or more external working carriages 40, 42 respectively, installed so as to be able to slide on the internal guide 22 and on the external guides 24, 26 respectively. The anthropomorphic robots 34A, 34B, 40, 42 can also be replaced with other kinds of mechanical arms. The number of the internal robots 34A, 34B, or external robots 40, 42, can also differ from two. In the present description the expressions "cylindrical", "conical" and "frustumconical" referred to the shell 2 and/or to the barrel 1 are to be understood as including prism—, pyramid—and pyramid section shapes respectively. The toggle mechanism 202, the device for blocking the stem of the pneumatic cylinder 207 (FIG. 5) and the toggle mechanism causing the movable jaw 210 to close or to open, and more generally the mechanism of the blocking gripper 194, can be replaced for example with lead screw+nut thread systems, bistable systems or still other drives, arranged for remaining blocked in a predetermined locking—, unlocking or positioning condition even without power supply from a pneumatic—e.g. compressed air—, fluidic, electric power supply circuit etcetera.

The invention claimed is:

1. A gripping device (194, 19) for manufacturing shell structures (1, 1') comprising a raw shell (2, 2') having at least one edge (20A, 20B, 20A', 20B'), the gripping device (194, 19) comprising:
   a handling carriage (19) by means of which the gripping device can move together with a shell structure loaded on the gripping device; and at least a blocking gripper (194) associated to the handling carriage (19) and arranged for gripping the raw shell (2, 2') by gripping said at least one edge (20A, 20B, 20A', 20B'), wherein the handling carriage is further provided with an annular structure and the blocking gripper comprises a fixing frame fixed to the annular structure, and a movable base hinged to the fixing frame so as to be able to rotate about a rotation axis which is parallel to the plane in which said fixing frame lies.

2. The device according to claim 1, further comprising a fixing opening (192) through which the shell (2) passes through, wherein a plurality of the blocking grippers are disposed around and/or near to the fixing opening (192) so as to fix the raw shell (2, 2') to the device while it is loaded on the device, by gripping at least part of the edge (20A, 20B, 20A', 20B') of the shell (2).

3. The device according to claim 1, wherein the raw shell (2, 2') has a substantially tubular shape and defines two open ends and two end edges (29A, 20B) at the open ends, and the blocking grippers (194) are positioned in a triad of Cartesian axes to fix the raw shell (2, the 2') on the device by blocking the two end edges (20A, 20B) of the raw shell (2).

4. The device according to claim 1, wherein the raw shell (2') has substantially the shape of a cylindrical sector (2') or cone sector or frustum of cone sector, and defines a curved end edge (20A', 20B'), and a side edge (68) having a curvature less pronounced than the end edge (20A', 20B'), and the blocking grippers (194) are positioned in a triad of Cartesian axes to fix the raw shell (2') on the gripping device so as to block the end edge (20A', 20B') and the side edge (68) of the shell (2).

5. The device according to claim 1, further comprising a rotary actuator for the handling carriage (19) and arranged for rotating a raw shell (2) on the handling carriage, while the raw shell (2) is on the gripping device (194) and blocked by the blocking grippers (194).

6. The device according to claim 1, further comprising a toggle mechanism that rotates the movable base around the rotation axis.

7. The device according to claim 1, wherein the blocking gripper comprises a pair of jaws attached to the movable base, at least one of said jaws being a movable jaw.

8. The device according to claim 7, wherein the movable jaw is arranged for rotating and translating in a plane defined by a radial direction and a center direction defined with respect to the annular structure so as to clamp the raw shell in the thickness direction of the raw shell.

9. The device according to claim 7, wherein the blocking gripper is arranged to be being opened and closed by the rotation and translation movements performed by the movable jaw.

* * * * *